United States Patent
Mérant et al.

(10) Patent No.: US 6,502,380 B1
(45) Date of Patent: Jan. 7, 2003

(54) MACHINE FOR HARVESTING FRUIT AND BERRIES AND THE LIKE FROM FRUIT TREES AND BUSHES PLANTED IN A ROW, AND SHAKER ROD FOR A MACHINE OF THIS KIND

(75) Inventors: Jean-Camille Mérant, La Chapelle-Hermier (FR); Daniel H. A. M. Le Nevé, Challans (FR)

(73) Assignee: New Holland Braud S.A., New Holland, PA (US)

( * ) Notice: Subject to any disclaimer, the term of this patent is extended or adjusted under 35 U.S.C. 154(b) by 0 days.

(21) Appl. No.: 09/890,521

(22) PCT Filed: Jan. 25, 2000

(86) PCT No.: PCT/EP00/00562

§ 371 (c)(1),
(2), (4) Date: Aug. 1, 2001

(87) PCT Pub. No.: WO00/45629

PCT Pub. Date: Aug. 10, 2000

(30) Foreign Application Priority Data

Feb. 5, 1999 (FR) .............................. 99 01346

(51) Int. Cl.⁷ ................................................ A01D 46/26
(52) U.S. Cl. ........................................ 56/330; 56/340.1
(58) Field of Search ................................ 56/328.1, 330, 56/331

(56) References Cited

U.S. PATENT DOCUMENTS

| | | | | |
|---|---|---|---|---|
| 4,771,594 A | * | 9/1988 | Deux et al. ................. | 56/328.1 |
| 5,666,796 A | * | 9/1997 | Korthuis ..................... | 460/113 |
| 5,747,137 A | * | 5/1998 | Cutolo et al. .......... | 264/177.13 |
| 5,904,034 A | * | 5/1999 | Youman et al. ............. | 56/328.1 |
| 6,094,825 A | * | 8/2000 | Hinson ......................... | 30/276 |
| 6,314,848 B2 | * | 11/2001 | Morabit et al. ................ | 30/276 |

* cited by examiner

Primary Examiner—Robert E. Pezzuto
Assistant Examiner—Meredith C. Petravick
(74) Attorney, Agent, or Firm—John William Stader; Larry W. Miller

(57) ABSTRACT

In this harvesting machine using shaker members in the form of rods to shake the fruit-bearing bushes and harvest the fruit, each shaker rod has an elongate base part which has, in use, a required flexibility characteristic for the rod in a horizontal plane and which has an oblong cross-section whose height is greater than its width, said cross-section having two main geometrical axes which are respectively horizontal and vertical and dimensions of height and width such that its moment of area about the horizontal main axis is significantly greater than its moment of area about the vertical main axis and its height is less than a predefined value. The base part forms a core for the rod, which can further include a wear part which covers the core and which is made of a material and has a thickness such that the rod has flexibility characteristics in the horizontal and vertical planes that are practically unchanged relative to those of the core, even after substantial wear of the wear part.

21 Claims, 5 Drawing Sheets

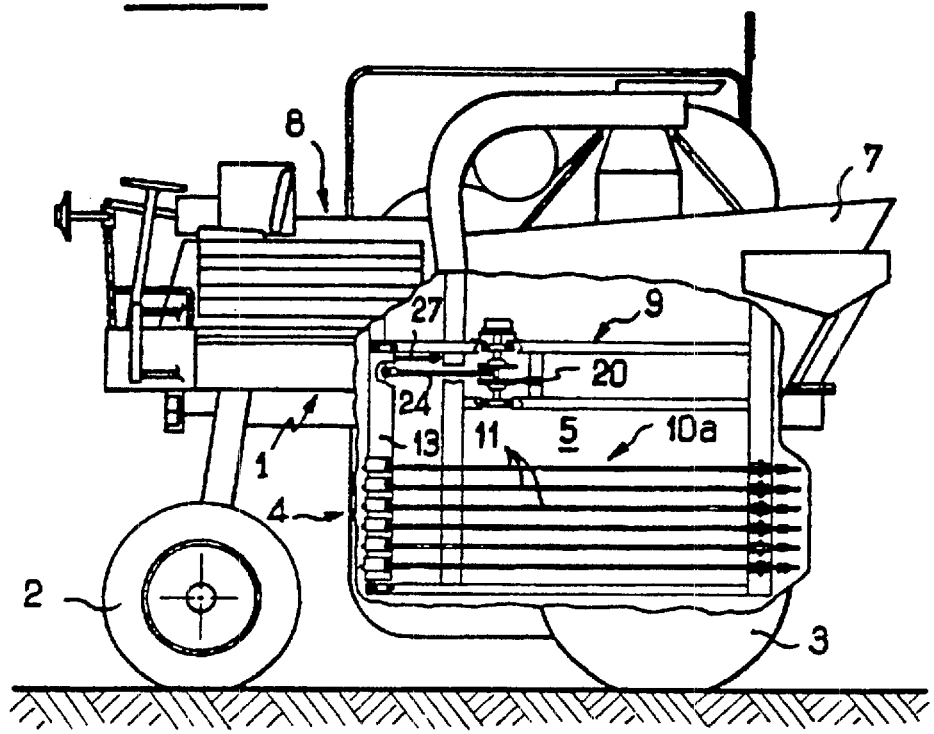
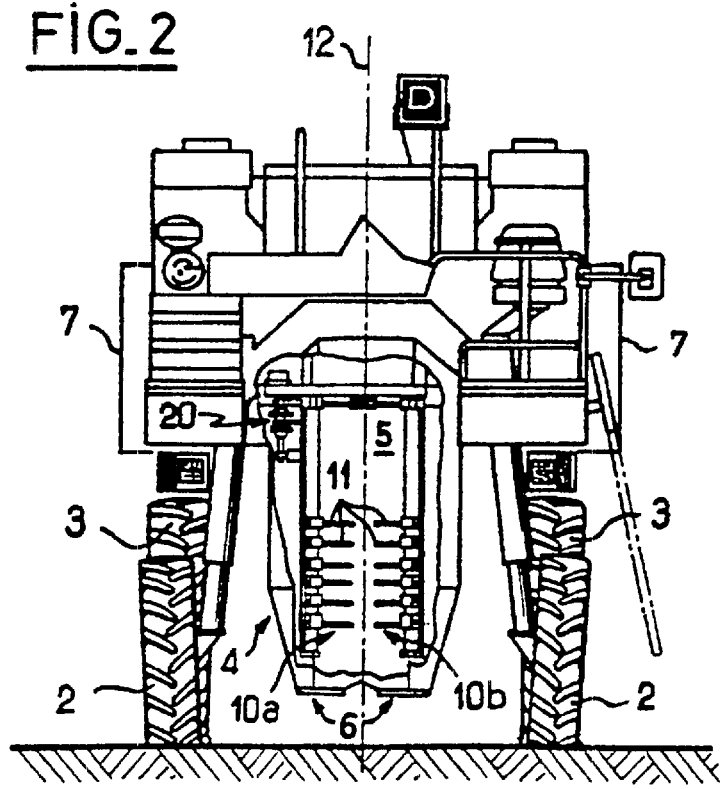

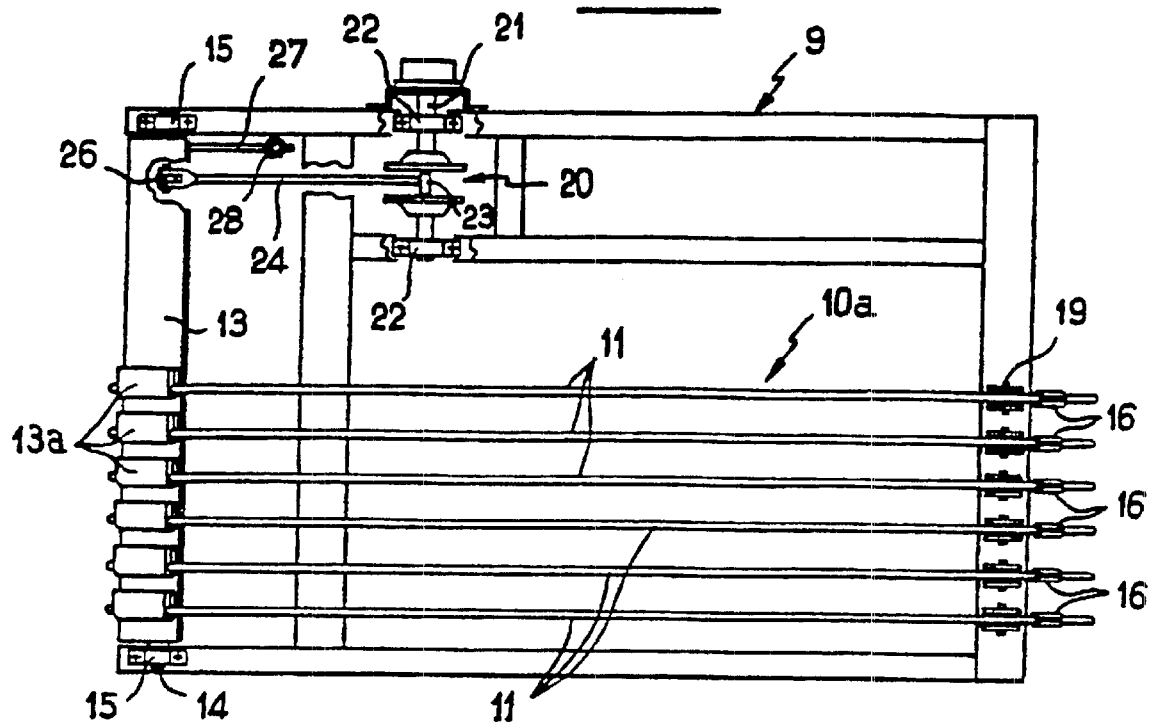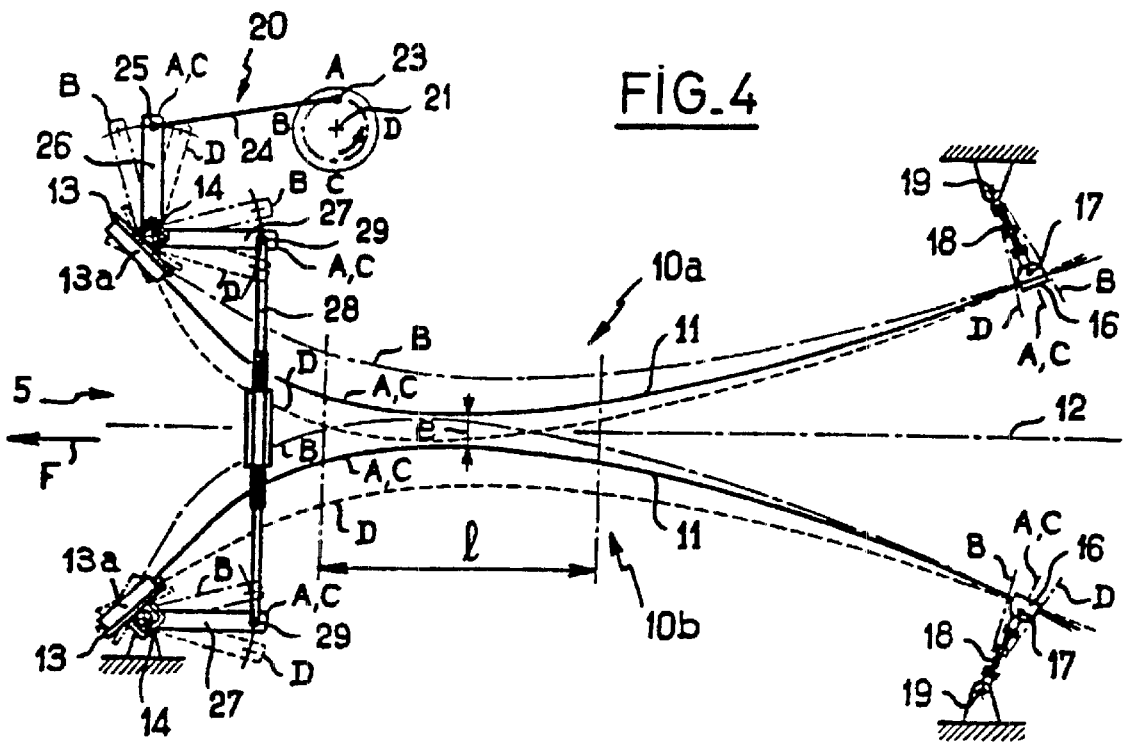

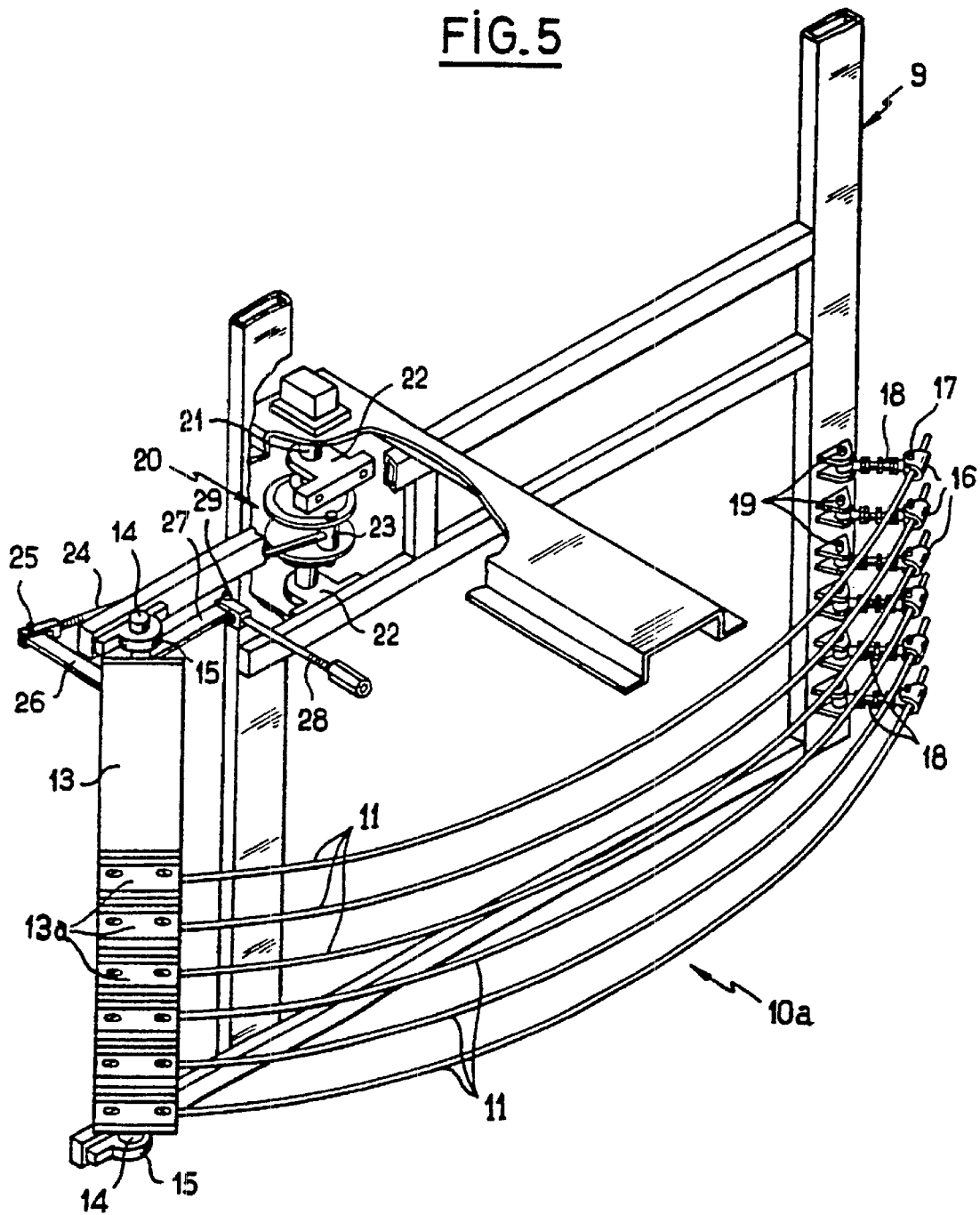

MACHINE FOR HARVESTING FRUIT AND BERRIES AND THE LIKE FROM FRUIT TREES AND BUSHES PLANTED IN A ROW, AND SHAKER ROD FOR A MACHINE OF THIS KIND

TECHNICAL FIELD

The present invention relates to a machine for harvesting fruits, berries and the like, from fruit trees and bushes planted in rows, of the type including a straddling chassis or frame capable of moving across a field, a shaker assembly mounted on the chassis and including at least one pair of elongate shaker members which have active parts extending in a first direction, broadly speaking in the longitudinal direction of the machine, and which are spaced transversely from each other and situated on respective opposite sides of the longitudinal median axis of the machine, each shaker member consisting of a flexible material rod, and a drive mechanism connected to the rods to drive them synchronously with a reciprocating motion in a second direction perpendicular to the first direction and defining therewith an oscillation plane for each rod.

The invention relates in particular, although not exclusively, to harvesting grapes and it will be more particularly described in connection with this type of harvest. However, the machine of the present invention is equally capable of being used for harvesting other fruits and berries, for example blackcurrants, gooseberries, raspberries, or coffee beans and olives.

BACKGROUND ART

Most conventional grape-picking machines use practically the same principle for harvesting grapes. The principle consists in beating or shaking the vines by imparting sinusoidal or pseudo-sinusoidal motion thereto with an amplitude and at a frequency suitable for detaching the grapes or the bunches of grapes. This motion is transmitted to the vine via shaker or beater members disposed in such a manner as to act either on the vinestock or stem or else on the vegetation, i.e. on the fruit-bearing portion of the vine, depending on the type and number of shaker or beater members used.

The shaker or beater members usually have active parts which broadly extend in a horizontal direction (first direction) in the longitudinal direction of the machine and said sinusoidal to-and-fro motion is effected in a horizontal direction (second direction) perpendicular to the first direction. However, for some types of fruit-bearing bushes, it can be judicious, in a known manner, to dispose the shaker members so that their active parts are inclined to the horizontal at a greater or lesser angle, as appropriate, and/or so that their sinusoidal to-and-fro motion is effected in a second direction that can also be inclined to the horizontal at a greater or lesser angle.

The percentage of bunches and/or individual grapes which are detached from the vine depends on the number and the amplitude of the oscillations to which a given bunch of grapes is subjected. The more energetic the shaking to which a given bunch of grapes is subjected, and the more frequently it is shaken, the more likely said bunch is or its individual grapes are to become detached from the vine.

The number and the amplitude of the oscillations to which a given bunch of grapes is subjected themselves depend on various parameters that can be chosen, in particular the amplitude and the frequency of the drive mechanism associated with the shaker members, the length of the active area of said shaker members, the stiffness or the flexibility thereof, and the speed at which the machine advances, together with other factors which are imposed by the vine itself, in particular the way it is trained, its shape and its resistance to the motion of the beater members.

However, while detaching bunches of grapes or individual grapes, the shaker members may damage the vine, which may be detrimental to the health of the vine and to the crop itself It is therefore generally necessary to find a compromise between the various parameters mentioned above in order to obtain an acceptable percentage of harvested grapes or bunches of grapes without giving rise to unacceptable damage to the vine. For more details of the prior art in this regard, see patent FR-A-2.605.487, which is hereby incorporated herein by way of reference.

In most prior art harvesting machines, the shaker members, if they are designed to act on the vegetation of the vine, consist of circular cross-section rods which are flexible to a greater or lesser degree. The rods are made either from a single material, such as glassfiber-reinforced resin, polyamide, spring steel, etc., or of two materials.

In the latter case (FR-A-2.159.250 and FR-A-2.313.859) each rod is made of fiberglass and its active portion intended to come into contact with the vegetation of the vine is provided with a metal tube or sleeve intended to avoid wear or cracking of the fiberglass rod because of rubbing and/or repeated impacts of said rod on the vegetation and/or on the stakes supporting the vine. The presence of the metal tube or sleeve increases the weight of the active region of the shaker rod and modifies how it bends under static and dynamic conditions. In particular, for a given frequency of oscillation, the amplitude of the oscillatory movement and the speed of the active part of the rod are increased, especially in the case of rods with a free rear end, and this can aggravate the damage caused to the vine.

Although a compromise may be found between the various parameters mentioned above to obtain an acceptable percentage of grapes or bunches of grapes or other berries harvested without causing excessive damage to the vine or other fruit-bearing bushes carrying the berries to be harvested, with shaker members consisting of circular cross-section rods it is difficult to prevent unwanted vertical movement of the rods in use, i.e. in a third direction perpendicular to the first and second directions mentioned above, in addition to their horizontal (second direction) oscillatory movement, which is the only one which is beneficial in terms of shaking the fruit-bearing bushes and thus of harvesting the fruit. The disadvantage of these unwanted vertical movements is that they detach leaves which are mixed with the harvested fruit and therefore complicate cleaning of the crop.

Also, the side of the shaker rods in contact with the vegetation of the fruit-bearing bushes to be shaken is worn by abrasion in use. As a result the flexibility of each rod in a horizontal oscillation plane, i.e. in the plane defined by the first and second directions mentioned above, increases as the rod wears away, making shaking less effective. This is because, as the rod becomes more flexible, it becomes less capable of entraining with it, during its oscillatory motion, the vegetation of the fruit-bearing bush to be shaken. Consequently, the rod must be replaced with a new rod after a period in service or following a degree of wear.

OBJECT OF THE INVENTION

The principal aim of the present invention is therefore to provide a harvesting machine of the type defined in the preamble whose shaker members in the form of flexible rods, are in use less subject to unwanted movement in the third direction.

A subsidiary object of the present invention is to provide a harvesting machine of the type defined above in which the shaker members also have an increased service life.

DISCLOSURE OF THE INVENTION

According to one aspect of the present invention, there is provided a machine for harvesting fruits, berries and the like, from fruit trees and bushes planted in rows, said machine including a straddling chassis capable of moving across a field, a shaker assembly mounted on the chassis and including at least one pair of elongate shaker members which have active parts extending in a first direction, generally in the longitudinal direction of the machine, and which are spaced transversely from each other and situated on respective opposite sides of the longitudinal median axis of the machine, each shaker member consisting of a flexible material rod, which has a required flexibility characteristic, and a drive mechanism connected to the rods to drive them synchronously with a reciprocating motion in a second direction generally perpendicular to the first direction and defining therewith an oscillation plane for each rod, characterized in that each rod of said at least one pair of shaker members has an elongate base part which has said required flexibility characteristic for the rod in its plane of oscillation and which has an oblong cross-section which is larger in a third direction, perpendicular to said plane of oscillation, than in said second direction, said cross-section having two main geometrical axes respectively oriented in the second and third directions and dimensions such that its moment of area ($I_x$) about the main axis oriented in the second direction is significantly greater than its moment of area ($I_y$) about the main axis oriented in the third direction.

To this end, the rod may have an elongate base part which has said required flexibility characteristic for the rod in its plane of oscillation and which has an oblong cross-section which is larger in a third direction, perpendicular to said plane of oscillation, than in said second direction, said cross-section having two main geometrical axes respectively oriented in the second and third directions and dimensions such that its moment of area (=second moment of inertia) about the main axis oriented in the second direction is significantly greater than its moment of area about the main axis oriented in the third direction and its dimension in said third direction is less than a predefined value.

In practice, the first and second directions mentioned above are usually horizontal or substantially horizontal and the third direction is then vertical or substantially vertical (however, as already mentioned above, the first and second directions may sometimes be inclined to the horizontal).

Under the above conditions, each rod is clearly more rigid in the vertical direction (third direction) than in the horizontal direction (second direction). Each rod is therefore less likely to be subject to unwanted vertical movement and if there is any such movement its amplitude is significantly reduced compared to that of a circular cross-section rod. Furthermore, by keeping the vertical dimension of the cross-section of said base part or that of each rod less than a predefined value, which is in turn at most equal to, and preferably less than, the diameter of prior art circular cross-section rods, each rod offers up to the vine or other fruit-bearing bush to be shaken a contact surface area the same as or smaller than that of prior art circular cross-section rods. This prevents the rod having an enlarged contact surface area, because of the oblong shape of the cross-section of said base part, which could burst the grapes or other berries on impact with the shaker rods. Moreover, the wear of each rod by abrasion can influence its horizontal stiffness, unless measures specified hereinafter are applied, but has virtually no effect on the vertical stiffness of the rod. Consequently, prolonged use of rods in accordance with the invention does not increase the risk of damage caused to the vines by unwanted vertical movements.

The machine in accordance with the invention can also have one or more of the following features:

a) the moment of area about the main axis oriented in the second direction is at least twice the moment of area about the main axis oriented in the third direction;

b) said predefined value is not greater than 32 mm and preferably equal to 30 mm for a rod having one end attached to a support which can pivot about a fixed point of said chassis and whose opposite end is attached to a point that can move in a direction substantially parallel to the longitudinal median axis of the machine;

c) said oblong cross-section is elliptical in shape with a major axis in the third direction and a minor axis in the second direction;

d) said oblong cross-section has a rectangular shape with a longer side in the third direction and a shorter side in the second direction;

e) said major axis or said longer side has a length from 25 mm to 28 mm and said minor axis or said shorter side has a length from 15 mm to 18 mm;

f) said base part of each rod forms a core for the rod concerned and each rod also has a wear part which covers said core and is made from a material and has a thickness such that said rod has flexibility characteristics in the second and third directions that are practically unchanged relative to those of said core, even after substantial wear of said wear part;

g) said wear part has a circular cross-section whose center is coincident with that of said core;

h) said wear part has a thickness which is greater on the side of the rod facing toward the longitudinal median axis of the machine than on the opposite side of said rod;

i) said wear part has a cross-section which, on the side of the rod facing toward the longitudinal median plane, is substantially the shape of a half-ellipse whose minor axis is colinear with the major axis of the elliptical cross-section of said core and, on the opposite side of said rod, the shape of a half-ellipse whose major axis is colinear with said major axis of said elliptical cross-section of said core, with a substantially constant thickness on the latter side;

j) said wear part has a cross-section whose dimensions in the third and second directions respectively measured along two main geometrical axes of the cross-section of said core are from 22 mm to 30 mm;

k) said core has an elliptical or rectangular cross-section whose larger dimension, in the third direction, is from 19 mm to 23 mm and whose smaller dimension, in the second direction, is from 10 mm to 15 mm;

l) the base part or core of each rod is made from a material chosen from the group including glassfiber-reinforced resin, aramide (Kevlar®) fibers or carbon fibers, and spring steel;

m) said core is a double core made up of two parallel metal strips spaced from each other in the second direction and which have their width oriented in the third direction; the two strips of the double core are preferably made of spring steel; each of the two strips is preferably from 14 to 18 mm wide and from 1 to 3 mm thick and their spacing is preferably from 6 to 12 mm; under these conditions the wear part preferably has a circular cross-section with a diameter from 23 to 30 mm;

n) the wear part of each rod is made of a material chosen from the group including polyamides, polyurethanes and polyethylenes;

o) said core is a different color to the wear part.

According to a further aspect of the invention, there is provided a shaker rod having one or more of the features defined above with regard to the rods of the harvesting machine indicated above.

BRIEF DESCRIPTION OF DRAWINGS

Other features and advantages of the present invention will emerge from the following description of various embodiments of the invention which is given by way of example only and with reference to the accompanying drawings, in which:

FIG. 1 is a partially cutaway side elevation view of a harvesting machine equipped with a prior art shaker assembly in which the present invention can be used;

FIG. 2 is a partially cutaway front elevation view of the harvesting machine from FIG. 1;

FIG. 3 is a side elevation view to a larger scale of part of the shaker assembly of the machine from FIGS. 1 and 2;

FIG. 4 is a diagrammatic plan view of the shaker assembly of the machine from FIGS. 1 and 2;

FIG. 5 is a perspective view of the part of the shaker assembly shown in FIG. 3;

DETAILED DESCRIPTION OF BEST MODES FOR CARRYING OUT THE INVENTION

Figure 6:
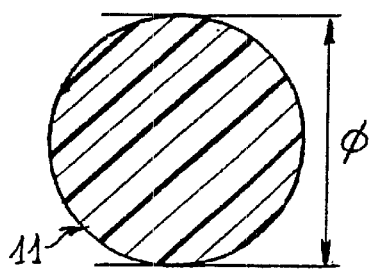
FIG. 6 is a view in cross-section of one of the rods of the shaker assembly of the prior art machine.

The harvesting machine shown in FIGS. 1 and 2 is a grape harvester and includes, in a conventional manner, a chassis 1 provided with front steerable wheels 2 and rear traction wheels 3 for moving the chassis 1 over the ground. The chassis 1 is in the form of a gantry in order to be able to straddle a row of plants. In known manner, the chassis 1 carries a harvesting assembly 4 including a shaker assembly 5 and two elevator conveyors 6 for collecting the grapes that have been detached by the shaker assembly 5 in order to convey them to at least one temporary storage tank 7 (generally two tanks are provided on respective sides of the machine). The chassis also has an engine 8 providing the rotational power necessary to drive the various active members of the machine and motive power to the wheels when the machine is of the self-propelled type.

The harvesting assembly 4 may be fixed in a permanent manner to the chassis 1 of the machine or else it may be made in the form of a removable assembly which is detachably fixed to the chassis 1 so as to be capable of being replaced by other equipment or accessories, such as spraying equipment, pruning equipment, equipment for tilling the ground, etc. The harvesting assembly 4 can therefore either be supported directly by the chassis 1 of the machine or else it may be supported by an auxiliary chassis 9. In a known manner, the auxiliary chassis 9 may be mounted fixedly relative to the chassis 1 or it may be pivotally mounted thereon with its top portion being pivotally attached to a horizontal fore-and-aft extending axis for swinging movement therearound.

As can be seen more particularly in FIG. 2, the shaker assembly 5, to which the invention relates in particular, includes two sets 10a and 10b of shaker members 11 with the two sets 10a and 10b being disposed facing one another on opposite sides of the longitudinal median plane 12 of the machine. As can be seen more clearly in FIG. 3, each set, for example the set 10a, may include six shaker members 11, for example, which are vertically spaced one above the other and which extend generally horizontally, although they may also slope downwardly from the front toward the rear of the machine. Although the shaker assembly shown in FIGS. 1 to 3 includes two sets of six shaker members, it is obvious that the invention is not limited to this number of shaker members and that their number may be decreased or increased depending on the various types of fruit tree or bush, and for a given type of fruit tree or bush depending on the variety, the way in which it has been trained, and the shape of the vegetation of the fruit trees or bushes. Variations may also depend on whether it is desired to shake the fruit trees or bushes by their trunks or by their vegetation.

Each shaker member 11 is constituted by a flexible material rod whose cross-section is very small compared to its length and, as can be seen in FIGS. 4 and 5 in particular, each rod 11 is curved to form an arc. The rods used may be pre-curved on manufacture but they are preferably rectilinear when manufactured, in which case they are curved by bending them when they are mounted on the shaker assembly 5.

With particular reference to FIGS. 3 to 5, one end of each rod 11 is firmly clamped in a clamp 13a which is rigidly fixed to a vertical support plate 13 (there is one plate 13 for each of the two sets 10a and 10b of rods 11). Each plate 13 is provided at each end with a vertically oriented stub axle 14 rotatably received in a bearing 15 fixed to the auxiliary chassis 9. The other end of each rod 11 is fixed in a support 16 which is hinged about a vertical shaft 17 at one end of a short link 18 whose other end is hinged to the auxiliary chassis 9 about a vertical shaft 19.

A drive device 20 producing a reciprocating motion is connected to the support plate 13 on one of the two sets 10a and 10b of rods 11 in order to cause the plate 13 to oscillate about the axis of the stub axles 14. The drive device 20 may be constituted, for example, by a connecting rod and crank system whose shaft 21 is rotatable in bearings 22 (as seen in FIGS. 3 and 5) which are fixed to the auxiliary chassis 9. The shaft 21 may be rotated by any appropriate transmission (not shown) connected to the output shaft of a motor, for example the engine 8 of the harvesting machine. One end of the connecting rod 24 is hinged to a crank pin 23 of the connecting rod and crank pin system 20 and its opposite end is hinged about a shaft 25 to a horizontal arm 26 which is rigidly fixed to the support plate 13 for the set 10a of rods 11. Two other horizontal arms 27 extend substantially parallel to the longitudinal median plane 12 of the machine and are rigidly fixed to respective vertical plates 13. The arms 27 are interconnected by a horizontal and transverse coupling rod 28 whose ends are hinged to free ends of the arms 27 about respective axes 29; the coupling rod 28 is preferably in the form of a rod whose length is adjustable, as shown in FIG. 4, in order to enable adjustment of the distance e between the two sets 10a and 10b of flexible rods 11.

In the following description, it is assumed that the harvesting machine advances in the direction indicated by the arrow F in FIG. 4. Under such conditions, the support plates 13 are at the front ends of the rods 11, whereas the supports 16 and the links 18 are at the rear ends of the rods 11, even though the opposite configuration could equally well be used. Under these conditions, the arcuate shape of the flexible rods 11 in the two sets 10a and 10b forms a converging entry area for fruit trees and bushes between said sets and in the direction from the front to the rear of the machine, followed by an active shaking area extending over a length/(FIG. 4), which in turn is followed by a diverging exit area for the fruit trees or bushes.

In FIG. 4, letters A, B, C and D indicate the positions taken up by the various components of the shaker assembly for four different angular positions A, B, C and D of the connecting rod and crank drive system 20. From FIG. 4, it is clear that during rotation of the crank pin 23 about the axis of the shaft 21, the curvature of the flexible rods 11 varies cyclically about an average value of curvature which corresponds to positions A and C and which lies between a minimum curvature and a maximum curvature. It can also be seen that the flexible rods 11 of the set 10a have a minimum curvature when the flexible rods 11 of the set 10b have a maximum curvature (position B), and conversely that the rods 11 of the set 10a have a maximum curvature when the rods 11 of the set 10b have a minimum curvature (position D). It can also be seen that as the rods 11 bend from their minimum curvature position toward their maximum curvature position, their front and rear ends remain at a substantially constant distance from the longitudinal median plane 12, whereas the active shaking area 1 reciprocates transversely on either side of said longitudinal plane 12. The amplitude of the transverse movement of the active portion of the flexible rods 11 depends on their maximum and minimum curvatures which in turn depend on the eccentricity on the crank pin 23 relative to the axis of the shaft 21. The eccentricity of the crank pin 23 is preferably adjustable in known manner in order to make it possible to adjust the amplitude of the transverse motion of the active portion of the flexible rods 11. The connecting rod 24 is preferably also in the form of a rod of variable length in order to make it possible to adjust the average position (positions A, C) of the rods 11 so that in this position the active parts of the rods of the two sets 10a and 10b, respectively, are symmetrical about the median longitudinal axis 12.

The machine described until now and shown in FIGS. 1 to 5 is well-known in the art (FR-B-2605487) and there is therefore considered to be no utility in describing it in more detail. Suffice to say that, in machines of this type, and in other prior art machines of this kind (FR-A-2638057, FR-A-2641158, FR-A-2645701, FR-A-2651408 or FR-A-2653636), the rods 11 usually have a circular cross-section, as shown in FIG. 6. This cross-section can be solid and have a diameter Ø of approximately 30 mm for a rod made of PA 6.6 polyamide or hollow with an outside diameter in the range from 30 to 35 mm (EP-A-0692181).

However, as already indicated above, with circular cross-section rods 11, it is impossible to prevent vertical movements in use which are superposed on their horizontal to-and-fro movement and which strip leaves from the vine.

Figure 7:
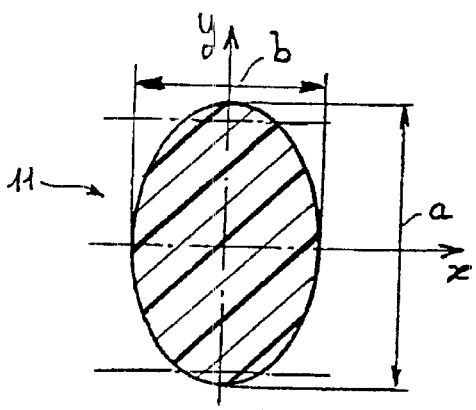
FIGS. 7 to 13 are views in cross-section showing various embodiments of a shaker rod in accordance with the invention.

To solve this problem, the invention proposes to stiffen the rods 11 in the vertical direction, e.g. by giving them an oblong, for example oval or elliptical, cross-section, as shown in FIG. 7, with a height-wise dimension a (major axis of the ellipse) greater than their width-wise dimension b (minor axis of the ellipse). Under these conditions, the moment of area (second moment of inertia) $I_x$ of the cross-section about the horizontal main axis x is greater than the moment of area $I_y$ of said cross-section about the vertical main axis y and, consequently, the vertical stiffness $R_y$, which is proportional to $I_x$, is greater than the horizontal stiffness $R_x$, which is proportional to $I_y$. In the case of an elliptical cross-section, $I_x$ and $I_y$ are given by the equations:

$$I_x = \pi a^3 b / 64 \quad (1)$$

$$I_y = \pi b^3 a / 64 \quad (2)$$

in which a and b have the meanings already explained above. For a rod of length L, built-in at one end and subjected to a load P at its other end, the value of the deflection of said other end due to the effect of the load P, i.e. the "flexing" F for a horizontal load P is given by the equation:

$$F_x = PL^3 / 3E.I_y \quad (3)$$

and that for a vertical load P by the equation:

$$F_y = PL^3 / 3E.I_x \quad (4)$$

In both equations (3) and (4), E represents the modulus of elasticity of the material constituting the rod and the expression $L^3/3E.I$ might be termed its "flexibility". The stiffness, which is the reciprocal of the flexibility, is therefore given by the following equations for the two main directions x and y, respectively:

$$R_x = 3E.I_y/L^3 \quad (5)$$

$$R_y = 3E.I_x/L^3 \quad (6)$$

The dimensions a and b of the cross-section of the rod 11 are preferably chosen so that $I_x$ is at least twice $I_y$ and the vertical stiffness $R_y$ is therefore at least twice the horizontal stiffness $R_x$. Given equations (1) and (2), this means that the vertical dimension a must be at least equal to b√2.

It can therefore be seen that if an elliptical cross-section shaker rod having the vertical and horizontal dimensions a and b (FIG. 7) and a circular cross-section prior art shaker rod (FIG. 6) with a diameter Ø, for which the following equation applies.

$$I_x = I_y = B\emptyset^4/64$$

are made in the same material, with the same length L and with same desired value for their horizontal stiffness or their horizontal flexibility (b≈Ø), the elliptical cross-section rod must have a vertical dimension a substantially greater than the diameter Ø of the circular cross-section rod if it is to have a greater vertical stiffness than the latter rod.

Consequently, the elliptical cross-section rod will have a lateral surface area of contact with the vegetation of the vine to be shaken which is significantly greater than that of a circular cross-section rod. As a result the risk of bursting grapes during horizontal oscillatory movement of the shaker rods 11 is increased, not only leading to loss of juice but also making it more difficult to clean the crop, since leaves and other impurities collected with the grapes will tend to "stick" to them more.

The solution consisting in increasing the vertical dimension of the cross-section of the rods 11 in order to increase their vertical stiffness and thereby to avoid or to minimize unwanted vertical movements thereof, therefore leads to other disadvantages which can entirely cancel out the benefits of that solution. To remedy this, the present invention proposes to choose the dimensions a and b of the cross-section of the rods 11 so that not only the ratio $I_x/I_y$ is significantly greater than 1, and preferably greater than 2, but also that the vertical dimension a of said cross-section remains below a predefined value. For instance, the predefined value can be equal to or less than the diameter Ø of a circular cross-section shaker rod having the same horizontal flexibility.

For example, for elliptical cross-section rods 11 intended for a machine of the type shown in FIGS. 1 to 5 and having a length of approximately 1.79 m, said predefined value is at most equal to 32 mm and preferably equal to 30 mm.

Under these conditions, to obtain a ratio $I_x/I_y$ having a value significantly greater than 1, and preferably greater than 2, the width or horizontal dimension b of the cross-section of the rods 11 must be significantly smaller than the previously mentioned predefined value. This being the case, it can be seen from equations (2) and (5) that the horizontal stiffness $R_x$ is significantly reduced if the dimension b is reduced, because b is raised to the power 3 in equation (2) and $R_x$ is proportional to $I_y$. If $R_x$ is greatly reduced, the horizontal flexibility is greatly increased in inverse proportion, with the result that the rod may become too flexible and incapable of entraining the vegetation of the vine to be shaken. To compensate the reduction in horizontal stiffness due to reducing the dimension b, it is therefore necessary to choose for the rods 11 a material that has a greater modulus of elasticity E.

Figure 8:
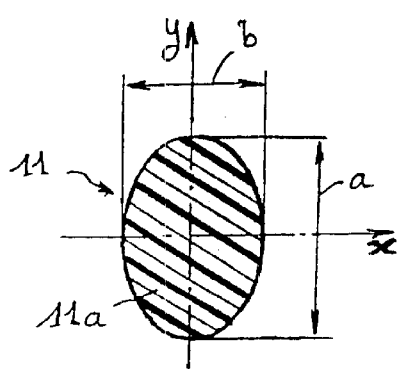

For example, if the elliptical cross-section rod from FIG. 7 is made of PA 6.6 polyamide (E=3 300 N/mm²), like the circular cross-section prior art rod from FIG. 6, the elliptical cross-section rod in accordance with the invention (FIG. 8) must be made from a material having a modulus of elasticity E higher than that of PA 6.6 polyamide, for example glass fibers in a polyester resin matrix (E=40 000 N/mm²) or carbon fibers in epoxy resin (E=130 000 N/mm²), and it can have a dimension a in the range from 25 to 28 mm and a dimension b in the range 15 to 18 mm to obtain the same required horizontal stiffness $R_x$ as the rods from FIGS. 6 and 7, a vertical stiffness $R_y$ at least twice the horizontal stiffness $R_x$, and a vertical dimension a not greater than the predefined value mentioned above.

The rods 11 described above have a base part 11a which has an elliptical cross-section but obviously their cross-section can have other oblong shapes which are elongate in the vertical direction, for example an oval shape or a rectangular shape, preferably with rounded corners or terminated at the top and bottom by a semi-circular or semi-elliptical part.

With the prior art rod (FIG. 6), as with the rod of the invention (FIG. 8), the side of the rod that faces the vegetation of the vine to be shaken rubs against the vine and/or against the stakes supporting the vine as the machine advances along the rows of vines. As a result this side of the rod is worn away by abrasion, as shown at 31 in FIG. 14.

Figure 14:
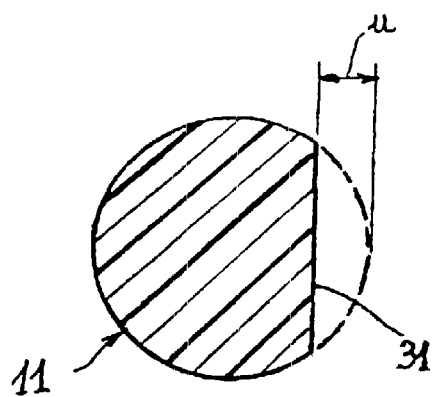
FIGS. 14 and 15 are views respectively corresponding to FIGS. 6 and 11 and provide a comparison of the effects of wear on a prior art shaker rod and a shaker rod in accordance with the invention.

The horizontal flexibility of the rod 11 therefore increases as the wear progresses, which progressive reduces the ability of the rod to shake the vine. With the prior art 30 mm diameter PA 6.6 polyamide circular cross-section rods, it is generally considered that the rods must be replaced by new rods after they have suffered approximately 6 mm of wear u (FIG. 14).

A subsidiary feature of the invention remedies this by making each rod 11 in two parts, of two different materials, namely a base part or core 11a made from a first material and a wear part 32 made from a second material, which covers the core 11a. The core 11a has an oblong cross-section, for example an elliptical cross-section like that shown in FIG. 9 or FIG. 11, or a rectangular cross-section with rounded corners, like that shown in FIG. 10. Other cross-section shapes are possible, however, as mentioned above. The material of the core 11a and the dimensions a and b of the cross-section are determined as described above with reference to the rod 11 shown in FIG. 8, in order to obtain the required flexibility (or stiffness) characteristics of the rod in the x and y directions. However, the cores 11a shown in FIGS. 9 to 13 will generally have dimensions a and b slightly smaller than the corresponding dimensions of the cross-section shown in FIG. 8 to allow for the fact that the total vertical dimension c (core 11a plus coating 32) must preferably be not greater than the predefined value mentioned above (32 mm or 30 mm).

The wear part or coating 32 is made of a material such that and has a thickness such that the combination of the core 11a and the coating 32 has substantially the same flexibility or stiffness characteristics in the horizontal and vertical directions as the core 11a alone. Under these conditions, wear of the wear part or coating 32 has little or no effect on the flexibility or stiffness characteristics of the rod 11. Consequently, provided that the wear does not reach the core 11a, the rod 11 retains virtually all of its efficacy. The wear part 32 can be made from a material chosen from the group including polyamides, polyurethanes and polyethylenes. If the material of the wear part 32 is also chosen to have good resistance to wear, in particular better wear resistance than PA 6.6 polyamide, as is the case with polyurethane, not only is the efficacy of the rod 11 from the shaking point of view maintained for a greater time period, for the same degree of wear, but also the service life of the rod is significantly increased.

Figure 9:
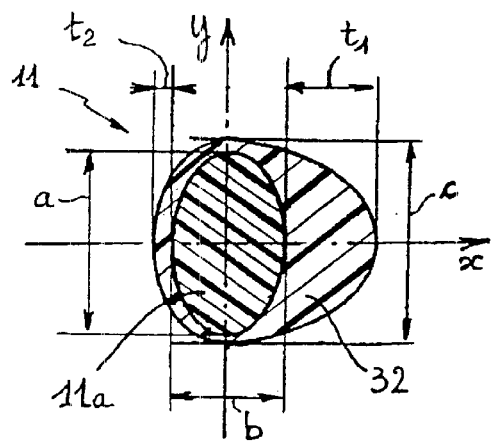

The wear part or coating 32 can have a constant thickness all around the core 11a. However, the coating 32 preferably has a thickness $t_1$ (FIG. 9) which is greater on the side of the rod that faces toward the longitudinal median plane of the machine, i.e. the side which, in use, is in contact with the vegetation of the vine, than the thickness $t_2$ on the opposite side of said rod. For example, on the side of the rod facing toward said longitudinal median plane, the outside contour of the cross-section of the wear part 32 can be substantially semi-elliptical in shape with the minor axis colinear with the major axis of the elliptical cross-section of the core 11a and, on the opposite side of the rod, the shape of a half-ellipse whose major axis is colinear with the major axis of the elliptical cross-section of the core 11a, the thickness $t_2$ of the wear part 32 being substantially constant over said opposite side of the rod 11, as shown in FIG. 9. The thickness $t_1$ is preferably in the order of 6 to 10 mm, the dimension a of the core 11a can be from 19 to 23 mm, the dimension b from 10 to 15 mm, and the dimensions c and $(t_1+b+t_2)$ the same and from 25 to 28 mm.

Figure 10:
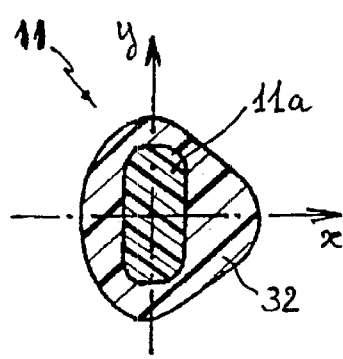

FIG. 10 shows a variant which differs from the embodiment shown in FIG. 9 in that the core 11a has a rectangular cross-section with rounded corners and in that the profile of the cross-section of the wear part 32, on the side facing toward the longitudinal median plane of the machine, is substantially triangular in shape with the apex rounded and located on the axis x and the sides adjacent the apex at an angle of approximately 45° to the axis x.

Figure 11:
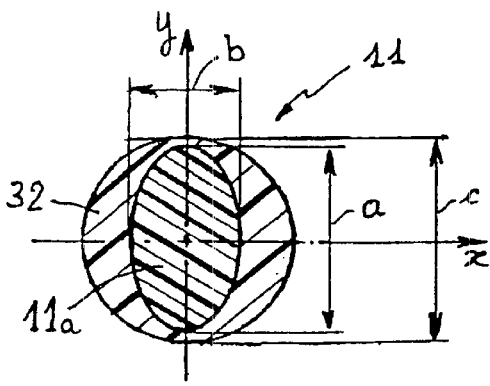

FIG. 11 shows another embodiment in which the wear part 32 has a circular cross-section whose center is coincident with that of the core 11a. Here the dimensions a, b and c can have the values indicated above in respect of the rod 11 from FIG. 9. The FIG. 11 embodiment is advantageous in various ways. Because of the circular cross-section of the rods 11, it requires little or no modification for fixing the rods 11 into the standard harvesting machine from FIGS. 1 to 5. Also, because of its symmetry about the axis y, after the rod has been worn down on one side (FIG. 15), it can be turned 180° about its longitudinal axis and used again with the same efficacy, which further increases its service life.

Figure 12:
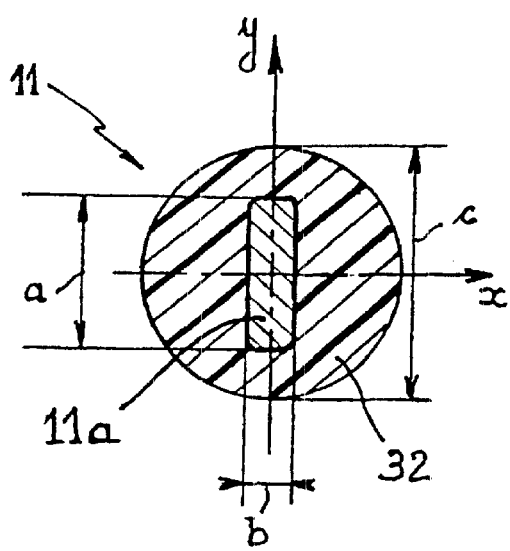

FIG. 12 shows another embodiment which differs from the embodiment of FIG. 11 in that the core 11a has a rectangular cross-section with rounded corners, as in FIG 10. Also, the core 11a can here be made of metal, for example spring steel. In this case, the dimension a of the core 11a can be from 14 to 18 mm, the dimension b from 5 to 8 mm and the diameter c of the wear part 32 from 22 to 26 mm.

Figure 13:
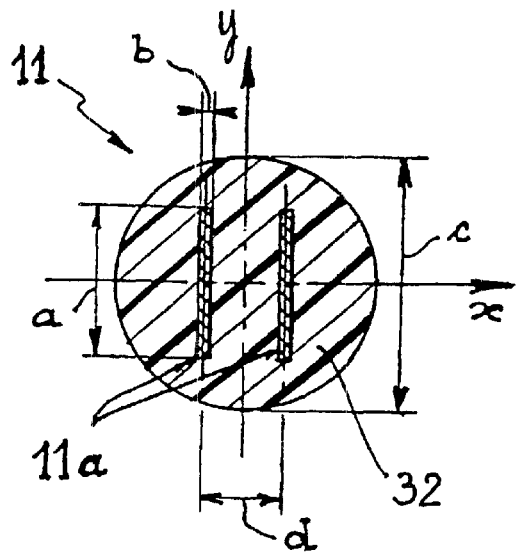

FIG. 13 shows another embodiment which differs from that shown in FIG. 12 in that the core 11a is now a double core consisting of two parallel metal, for example spring steel, strips spaced from each other by a distance d in the direction x. The width a of each strip of the core 11a extends in the direction y. In this embodiment, each strip can have a width a from 14 to 18 mm and a thickness b from 1 to 3 mm, the spacing d of the blades can be from 6 to 12 mm, and the diameter c of the wear part 32 can be from 23 to 30 mm.

In all the embodiments (FIGS. 8 to 13), the rods 11 are correctly oriented on the auxiliary chassis 9 by the orientation of horizontal holes (not shown) in the front ends of the rods which receive bolts used to clamp the front end into the clamps 13a (FIG. 5).

In the embodiments shown in FIGS. 9 to 13, the single or double core 11a can advantageously be a different color to the coating 32. If the respective materials of the core 11a and the coating 32 are inherently the same color, the color difference can be obtained by adding a colored pigment or other coloring agent to the base material of the core 11a or that of the coating 32 when they are made. Under these conditions, the core can serve as a wear indicator which, when it is exposed by wear, indicates that the rod must be replaced soon (or turned 180° in the case of FIGS. 11 to 13).

By way of comparative example, four concrete examples will now be described to show the effect of wear on the horizontal stiffness $R_x$ and the vertical stiffness $R_y$ of the rods (the effect of wear on the vertical stiffness is much lower because the wear is restricted to one side of the rod).

EXAMPLE 1

A rod 11 was made from a single material, namely PA 6.6 polyamide (E=3300 N/mm²), and had a circular cross-section (FIG. 6) with a diameter of 30 mm and a length of 1.79 m. A wear u of 6 mm was to be tolerated (FIG. 14). Under these conditions, the rod had the following characteristics:

When new:
$I_y = I_x = 39\ 761$ mm⁴
$R_x = R_y = 3E \cdot I_y/L^3 = 0.0856$ N/mm
When worn:
$I_y = 24\ 440$ mm⁴
$R_x = 0.0522$ N/mm
When worn, the horizontal stiffness was therefore no more than around 61% of the stiffness when new.

EXAMPLE 2

Figure 15:
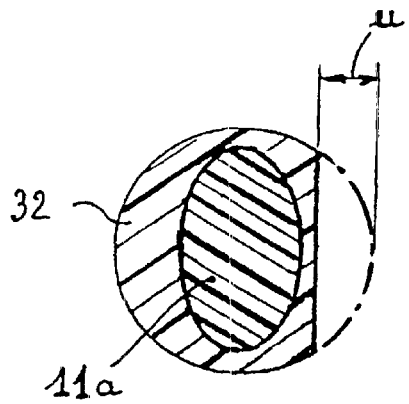

A rod the same length as in example 1 was made as shown in FIG. 11. The is coating 32 had a diameter c of 27 mm and the core 11a had a major axis a 19 mm long and a minor axis b 13 mm long. The core 11a was made of glass fibers and polyester resin ($E_1$=40 000 N/mm²) and the coating 32 was made of PA 6.6 polyamide ($E_2$=3300 N/mm²). Again, a wear u of 6 mm was to be tolerated (FIG. 15). The moment of area $I_{1y}$ of the core 11a, which is given by equation (2) above, was the same when the rod was new and worn:
$I_{1y} = 2\ 049$ mm⁴
The horizontal stiffness $R_{1x}$ and the vertical stiffness $R_{1y}$ of the core 11a, which are given by equations (5) and (6) above, were the same when the rod was new and worn:
$R_{1x} = 0.0429$ N/mm and $R_{1y} = 0.0916$ N/mm
The moments of area $I_{2x}$ and $I_{2y}$ of the coating 32 when new are given by the equations:

$$I_{2x} = \pi(c^4 - a^3 b)/64 \qquad (7)$$

$$I_{2y} = \pi(c^4 - ab^3)/64 \qquad (8)$$

whence, in this case: $I_{2x} = 21\ 710$ mm⁴ and $I_{2y} = 24\ 038$ mm⁴ when new.

The horizontal stiffness $R_{2x}$ and vertical stiffness $R_{2y}$ of the coating 32, which are also given by equations (5) and (6), were, when new:
$R_{2x} = 0.0415$ N/mm and $R_{2y} = 0.0375$ N/mm
The overall horizontal stiffness $R_x$ of the composite rod from FIG. 11 when new is given by the equation:

$$R_x = 3(E_1 I_{1y} + E_2 I_{2y})/L^3 \qquad (9)$$

in which $E_1$ and $E_2$ are the moduli of elasticity of the core 11a and the coating 32, respectively, $I_{1y}$ and $I_{2y}$ are their moments of area about the axis y and L is the length of the rod. In other words, the global horizontal stiffness $R_x$ is given by the equation:

$$R_x = R_{1x} + R_{2x} \qquad (10)$$

and in the present example, when new, had the value:
global $R_x = 0.0844$ N/mm
Similarly, the vertical stiffness $R_y$ is given by the equation:

$$R_y = R_{1y} + R_{2y} \qquad (11)$$

and in the present example, when new, had the value:
global $R_y = 0.1291$ N/mm
In this case the horizontal stiffness $R_{2x}$ of the coating 32 therefore represented 49% of the global stiffness $R_x$ when new.

After a wear u of 6 mm, $I_{1x}$, $I_{1y}$, $R_{1x}$ and $R_{1y}$ had the same values as when new, $I_{2x}$, $_{I2y}$, $R_{2y}$, and $R_{2y}$ had the following values:
$I_{2x} = 20\ 716$ N/mm and $I_{2y} = 13\ 546$ mm⁴
$R_{2y} = 0.0234$ N/mm and $R_{2y} = 0.0357$ N/mm
and the global horizontal stiffness $R_x$ and the global vertical stiffness $R_y$ when worn had the following values:
$R_x = R_{1x} + R_{2x} = 0.0663$ N/mm
$R_y = R_{1y} + R_{2y} = 0.1273$ N/mm
It can be seen that the global horizontal stiffness $R_x$ when worn represented 78% of the global horizontal stiffness when new. This result was significantly better that that obtained with the circular cross-section prior art rod of example 1. The behavior of the rod of example 2 when 100% worn (u=6 mm) corresponded to that of the rod of example 1 when worn only about 50%. When 100% worn, the rod of example 1 therefore had worse behavior than that of example 2. However, because the material of the coating 32 was the same as that of the rod of example 1, wear occurred equally quickly in both examples and the service life of the rod was not increased unless more than 6 mm of wear u was deemed to be acceptable in example 2 because, with 6 mm of wear, the rod of example 2 still had acceptable behavior. It can also be seen that the global vertical stiffness $R_y$ was significantly greater than the global horizontal stiffness $R_x$ when the rod was both new and worn.

EXAMPLE 3

A rod the same length as in examples 1 and 2 had a shape similar to that of FIG. 11 but with the following dimensions:

a=18 mm; b=11 mm and c=25 mm.

The core 11a was made of carbon fiber and epoxy resin ($E_1$=130 000 N/mm$^2$) and the coating 32 was made of polyurethane ($E_2$=60 N/mm$^2$).

Under these conditions, the rod had the following characteristics: When new:

$I_{1x}$ = 3149 mm$^4$ and $I_{1y}$ = 1176 mm$^4$     core 11a
$R_{1x}$ = 0.0800 N/mm and $R_{1y}$ = 0.2141 N/mm
$I_{2x}$ = 16026 mm$^4$ and $I_{2y}$ = 17999 mm$^4$     coating 32
$R_{2x}$ = 0.0005 N/mm and $R_{2y}$ = 0.0005 N/mm
Global Rx = 0.0805 N/mm and global $R_y$ = 0.2146 N/mm Here, when new, the horizontal stiffness $R_{2x}$ of the coating 32 represented only a negligible percentage (0.7%) of the global horizontal stiffness $R_x$ of the rod and the global vertical stiffness $R_y$ was twice $R_x$.

When worn (u=6 mm).

$I_{1x}$, $I_{1y}$, $R_{1x}$ and $R_{1y}$ did not change
$I_{2x}$ = 15618 mm4 and $I_{2y}$ = 10409 mm4     coating 32
$R_{2x}$ = 0.0003 N/mm and $R_{2y}$ = 0.0005 N/mm
Global $R_x$ = 0.0803 N/mm and global $R_y$ = 0.2146 N/mm In example 3, the global horizontal stiffness with 6 mm of wear represented 99.7% of the global horizontal stiffness when new. It can therefore be seen that, in this example, the wear had virtually no effect on the behavior of the shaker. Also, the global vertical stiffness $R_y$ was unchanged compared to the value when new and therefore remained twice $R_x$. Also, because polyurethane is in most cases more wear resistant than PA 6.6 polyamide, the service life of the rod from example 3 is increased relative to that of examples 1 and 2. Furthermore, as the rod of example 3 can be turned 180° to present its unworn face to the vegetation, with the same wear potential and without the behavior of the rod suffering, the service life of the rod from example 3 can be significantly more than twice that of example 1.

EXAMPLE 4

The rod, which was the same length as in examples 1 to 3, had a shape similar to that of FIG. 13, with the following dimensions:

A=17 mm; b=2 mm; c=26 mm and d=6.5 mm.

The two strips of the double core 11a were made of spring steel ($E_1$=210 000 N/mm$^2$) and the coating 32 was of polyurethane ($E_2$=60 N/mm$^2$).

Under these conditions, calculation shows that the rod had the following characteristics:

When new:

$I_{1x}$ = 1638 mm$^4$ and $I_{1y}$ = 741 mm$^4$     core 11a
$R_{1x}$ = 0.0814 N/mm and $R_{1y}$ = 0.1799 N/mm
$I_{2x}$ = 20794 mm4 and $I_{2y\ =\ 21691}$ mm4     coating 32
$R_{2x}$ = 0.0007 N/mm and $R_{2y}$ = 0.0006 N/mm
which gives, for the rod as a whole:
Global $R_x$ = 0.0821 N/mm and global $R_y$ = 0.1805 N/mm
When worn (u = 6 mm):
$I_{1x}$, $I_{1y}$, $R_{1x}$ and $R_{1y}$ did not change
$I_{2x}$ = 20386 mm4 and $I_{2y}$ =14101 mm4     coating 32
$R_{2x}$ = 0.0004 N/mm and $R_{2y}$ = 0.0006 N/mm
which gives, for the rod as a whole when worn:
Global $R_x$ = 0.0818 N/mm and global $R_y$ = 0.1805 N/mm The results obtained in example 4 were similar to those obtained in example 3, from the point of view of the insensitivity of $R_x$ and $R_y$ to wear (at least provided that it remained less than or equal to 6 mm) and their ratio $R_y/R_x$, which remained greater than 2.

It goes without saying that the embodiments of the invention described above are given by way of illustrative and non-limiting example only and that many modifications that will be evident to the skilled person do not depart from the scope of the invention as defined in the accompanying claims. For example the base part or core 11a of the rods can be hollow, like the rods described in document EP-A-0692181.

Also, although the present invention has been more particularly described in connection with a self-propelled harvesting machine, the invention clearly applies equally well to harvesting machines coupled to a tractor.

What is claimed is:

1. A machine for harvesting fruits and berries from fruit trees and bushes planted in rows, said machine including a straddling chassis capable of moving across a field, a shaker assembly mounted on the chassis and including at least one pair of elongate shaker members which have active parts extending in a first direction, generally in the longitudinal direction of the machine, and which are spaced transversely from each other and situated on respective opposite sides of the longitudinal median axis of the machine, each shaker member consisting of a flexible material rod, which has a required flexibility characteristic, and a drive mechanism connected to the rods to drive them synchronously with a reciprocating motion in a second direction generally perpendicular to the first direction and defining therewith an oscillation plane for each rod, wherein each rod of said at least one pair of shaker members has an elongate base part which has said required flexibility characteristic for the rod in its plane of oscillation and which has an oblong cross-section which is larger in a third direction, perpendicular to said plane of oscillation, than in said second direction, said cross-section having two main geometrical axes respectively oriented in the second and third directions and dimensions such that its moment of area ($I_x$) about the main axis oriented in the second direction is significantly greater than its moment of area ($I_y$) about the main axis oriented in the third direction.

2. The machine described in claim 1, wherein the moment of area ($I_x$) about the main axis oriented in the second direction is at least twice the moment of area ($I_y$) about the main is oriented in the third direction.

3. The machine described in claim 2, wherein said cross-section has a dimension in said third direction is less than a predefined value.

4. The machine described in claim 3, characterized in that said predefined value is not greater than 32 mm and preferably equal to 30 mm for a rod having one end attached to a support which can pivot about a fixed point of said chassis and whose opposite end is attached to a point that can move in a direction substantially parallel to the longitudinal median axis of the machine.

5. The machine described in claim 4, characterized in that said oblong cross-section is elliptical in shape with a major axis in the third direction and a minor axis in the second direction.

6. The machine described in claim 5, characterized in that said oblong cross-section has a rectangular shape with a longer side in the third direction and a shorter side in the second direction.

7. The machine described in claim 6, characterized in that said major axis or said longer side has a length in the range from 25 to 28 mm and said minor axis or said shorter side has a length in the range from 15 to 18 mm.

8. The machine described in claim 7, characterized in that said base part of each rod forms a core for the rod concerned and in that each rod also has a wear part which covers said core and is made from a material and has a thickness such that said rod has flexibility characteristics in the second and third directions that are practically unchanged relative to those of said core, even after substantial wear of said wear part.

9. The machine described in claim 8, characterized in that said wear part has a circular cross-section whose center is coincident with that of said core.

10. The machine described in claim 9, characterized in that said wear part has a thickness ($t_1$) which is greater on the side of the rod facing toward the longitudinal median axis of the machine than on the opposite side of said rod.

11. The machine described in claim 10, characterized in that said base part has an oblong cross-section which is elliptical in shape with a major axis in the third direction and a minor axis in the second direction, and said wear part has a cross-section which, on the side of the rod facing toward the longitudinal median plane, is substantially the shape of a half-ellipse whose minor axis is colinear with the major axis of the elliptical cross-section of said core and, on the opposite side of said rod, the shape of a half-ellipse whose major axis is colinear with said major axis of said elliptical cross-section of said core, with a substantially constant thickness on the latter side.

12. The machine described in claim 11, characterized in that said wear part has a cross-section whose dimensions in the third and second directions respectively measured along two main geometrical axes of the cross-section of said core are in the range from 22 mm to 30 mm.

13. The machine described in claim 12, characterized in that said core has an elliptical or rectangular cross-section whose larger dimension, in the third direction, is in the range from 19 mm to 23 mm and whose smaller dimension, in the second direction, is in the range from 10 mm to 15 mm.

14. The machine described in claim 13, characterized in that the base part or core of each rod is made from a material chosen from the group consisting of glass fiber-reinforced resin aramide fibers, carbon fibers and spring steel.

15. The machine described in claim 8, characterized in that said core is a double core made up of two parallel metal snips spaced from each other in the second direction and which have their width oriented in the third direction.

16. The machine described in claim 15, characterized in that the two strips of the double core are made of spring steel.

17. The machine described in claim 16, characterized in that each of the two strips is from 14 to 18 mm wide ad from 1 to 3 mm thick and their spacing is from 6 to 12 mm.

18. The machine described in claim 17, characterized in that the wear part has a circular cross-section with a diameter (c) in the range from 23 to 30 mm.

19. The machine described in claim 18, characterized in that the wear part of each rod is made of a material chosen from the group consisting of polyamides, polyurethanes and polyethylenes.

20. The machine described in claim 16, characterized in that said core is a different color to the wear part.

21. The machine described in claim 20, characterized in that the first and second directions are horizontal or substantially horizontal and the third direction is vertical or substantially vertical.

* * * * *